Jan. 12, 1960 V. F. CARTWRIGHT 2,921,301
DISTANCE MEASURING SYSTEM
Filed July 6, 1956 2 Sheets-Sheet 1
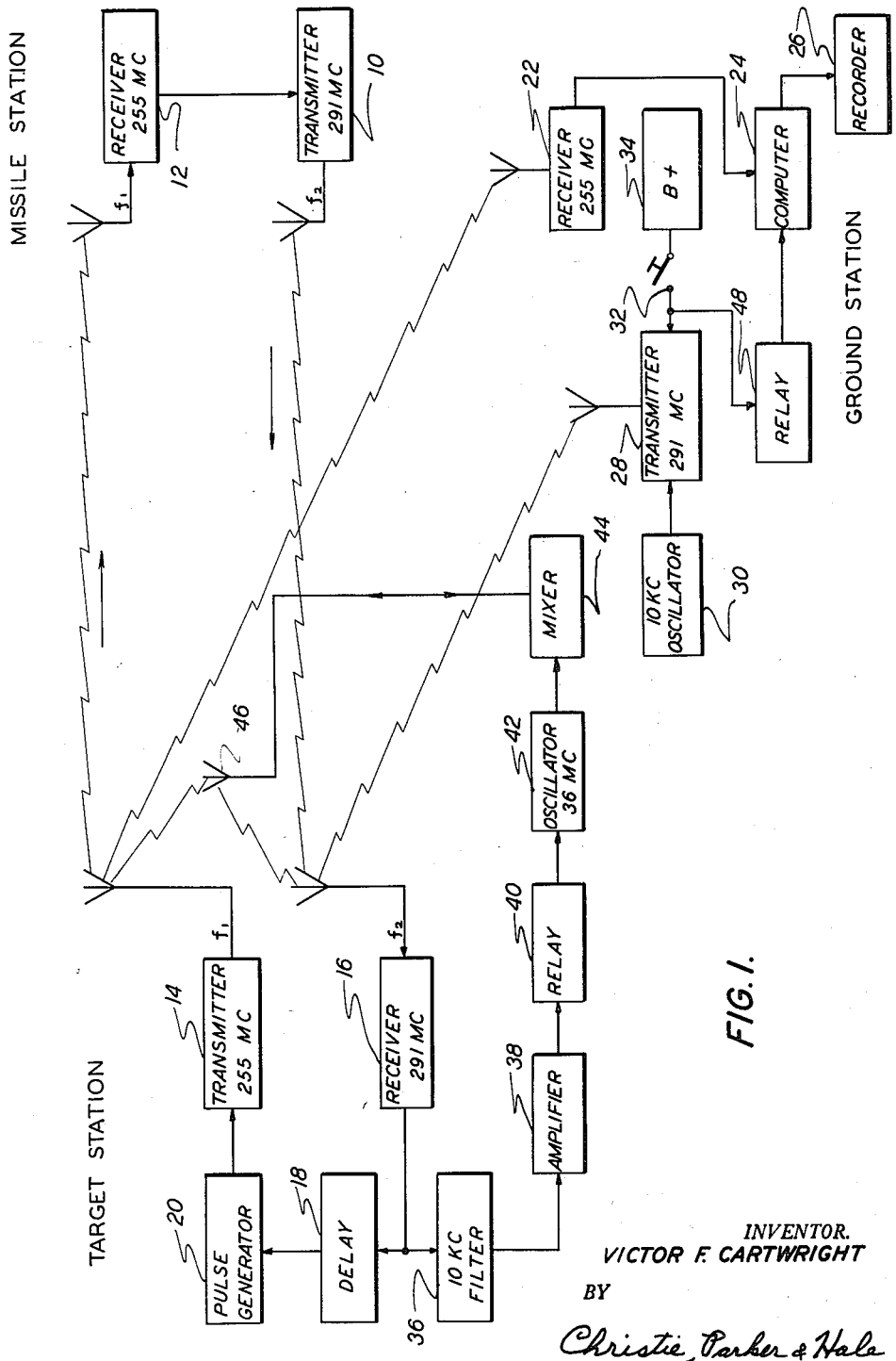
FIG. I.
INVENTOR.
VICTOR F. CARTWRIGHT
BY
Christie, Parker & Hale
ATTORNEYS

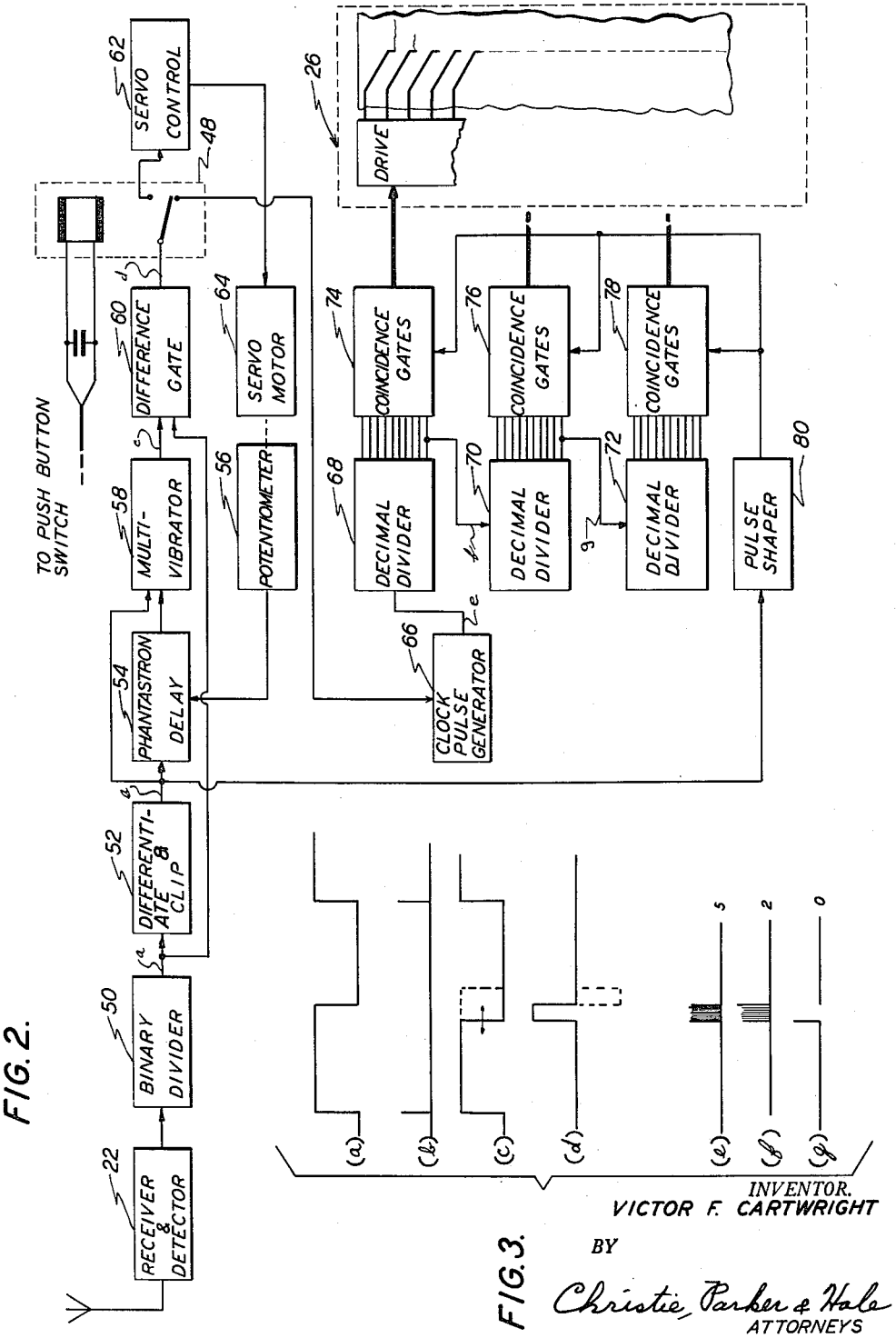

United States Patent Office 2,921,301
Patented Jan. 12, 1960

2,921,301

DISTANCE MEASURING SYSTEM

Victor F. Cartwright, Pasadena, Calif., assignor to The Ralph M. Parsons Company, Pasadena, Calif., a corporation of Nevada Application July 6, 1956, Serial No. 596,246

8 Claims. (Cl. 343—6)

This invention relates to distance measuring equipment and, more particularly, is concerned with apparatus for continuously indicating the distance between two relatively moving points.

With the development of missiles for anti-aircraft defense, the need has developed for apparatus which would effectively and accurately indicate the miss-distance between the missile and a target in order to evaluate the accuracy and performance of the missile. Various systems have heretofore been proposed for providing miss-distance indicators (M.D.I.). Many proposed systems, such as a system in which the missile is magnetized and the magnetic field measured at the target, or a system in which electrostatic capacity variations between the missile and the target is measured, or the use of radioactive material in the missile which is measured at the target, did not yield sufficient accuracy to be of practical value. Various acoustic and optical methods have also been proposed. The accuracy of known acoustic systems has proved to be adversely affected by target motion, while the optical system suffers from the disadvantage of providing a difficult data handling or recording problem. Furthermore, triangulation techniques generally required for optical measurements require a prohibitively long base line to measure accurately the miss-ranges that may be encountered.

Various electronic schemes have heretofore been proposed, such as Doppler radar and pulse radar systems, phase modulation systems and the like. While systems of this type have proved capable of meeting the accuracy and reliability requirements of an M.D.I. system, they have proved to have disadvantages in their relative complexity. In addition, such known systems require additional telemetering apparatus for relaying the information to a ground station, and in addition do not provide a direct reading range indication.

The present invention provides a method for measuring electronically and indicating directly the distance between two relatively moving points. The invention utilizes the well-known "singing-frequency" principle in which two pulse transponders located at two separated points cooperate in such a manner that a space-coupled oscillator is created. The frequency of the oscillation is a function of transponder separation, and is measured to derive an indication of the distance between the transponders. Such distance measuring systems have heretofore been described in the prior art (see for example Patent No. 2,467,299 in the name of Espenschied).

The present invention provides improved apparatus utilizing the singing-frequency principle, but particularly adapted to M.D.I. measurements under a wide variety of operating conditions. Further, the present invention provides a system which is self-telemetering, data being received, measured, and recorded at a suitable ground station. The present invention is characterized by the fact that it provides automatic calibration at the ground station to allow for frequency changes in the system resulting from conditions other than the changing distance between the measured points.

In brief, the invention contemplates a system comprising an oscillating loop with a receiver and transmitter located at both the missile and the target. Signals are received at the missile on a carrier frequency $f_2$ and retransmitted on a carrier frequency $f_1$, while at the target, the frequency $f_1$ is received and retransmitted on the frequency $f_2$. By providing sufficient gain in the system, this loop is made regenerative with the oscillation appearing as a pulse modulation on each of the carriers. The fundamental frequency of the oscillation around the loop, i.e. the frequency at which the pulse modulation travels around the loop, depends upon the fixed delay built into the equipment plus the variable delay due to the distance between the two transponders. The frequency of oscillation F varies in accordance with the following relation:

$$F = \frac{1}{T_1 + \frac{2R}{C}}$$

where $T_1$ is the fixed time delay of the system, $2R$ is the round trip distance between the transponders, and $C$ is the velocity of light.

Since the oscillating signal modulates the carrier of the target transmitter, range information is automatically broadcast and may be received and recorded at any remote point. In order to calibrate the recorder at the remote point to reduce the received information to a distance indication, it is necessary that a fixed delay of the system be known. Calibration is effected by transmitting a modulated signal to the target which is detected and acts to momentarily produce a direct coupling between the transmitter and the receiver so as to shunt the closed loop. By having all the fixed delay confined substantially to the target transponder, a shunted loop at the target transponder can be made to oscillate at a frequency which would correspond to the frequency that would result if a zero range existed between the target and the missile. This provides a zero range indication at the ground station which is utilized to calibrate the distance indicator.

For a better understanding of the invention reference should be had to the accompanying drawings, wherein:

Fig. 1 is a schematic block diagram of the missile distance indicating system of the present invention;

Fig 2 is a schematic block diagram of the computer and distance indicating recorder in the ground station; and Fig. 3a–g is a series of wave forms useful in explaining the operation of the computer in the ground station.

Referring to Fig. 1 in detail, the missile station is shown as comprising a transmitter 10 having an output carrier frequency of $f_2$ which, for example, may be of the order of 291 megacycles. The transmitter 10 is directly modulated by the output of the receiver 12 which is tuned to a frequency $f_1$ which, for example, may be of the order of 255 megacycles. The transmitter 10 and receiver 12 may be of conventional transponder design well known in the communications art.

The transponder of the missile station cooperates with a similar transponder at the target station including a transmitter 14 designed to transmit on the carrier frequency $f_1$. The transponder further includes a receiver 16 which is tuned to receive carrier signals of the carrier frequency $f_2$. The receiver 16 is preferably designed to include a tuned radio frequency (R-F) amplifier section, a class A video amplifying section, and an output detector. The R-F amplifier section should be provided with considerable automatic gain control to compensate for the wide variation in signal strength occurring with changes in distance between the target and missile transponder. Further the automatic gain control should maintain substantially constant phase shift of the receiver over a wide range of input signal amplitude.

The demodulated output signal of the receiver 16 is fed to a delay circuit 18 which introduces a fixed delay for the purpose which will hereinafter become more apparent. The output of the fixed delay 18 is coupled to a pulse generator 20, which may for example be a monostable multivibrator having a one microsecond recovery time. Thus a one microsecond pulse is fed to the modulator input of the transmitter 14 in response to a received signal at the receiver 16.

It will be seen from the description thus far that the target transponder and the missile transponder form a closed loop path which, due to the gain in the receiver 16, may be made regenerative. This regenerative or ringing frequency has a fundamental value determined by the time delay around the loop. By virtue of the pulse generator 20, the regenerated signal is in the form of a pulse modulation on the respective carrier signals between the two transponders.

The total time delay around the closed loop is made up primarily of two factors, namely the fixed time delay introduced by the time delay circuit 18 and the propagation time delay resulting from the propagation time between the target station and the missile station. The fixed time delay establishes the minimum ringing frequency, corresponding to zero range between the transponders. It is preferably set at a value equal to or slightly greater than the delay due to propagation time at the maximum range at which the system is designed to operate. A time delay of 20 microseconds was found preferable.

Located at a ground station is a receiver 22 which is tuned to the carrier frequency $f_1$ of the transmitter 14. The demodulated output of the receiver 22 is a series of pulses having a repetition frequency which is equal to the regenerative frequency of the closed loop formed by the transponders of the target station and the missile station. It will be appreciated that the period between pulses at the output of the receiver 22 is equal to the total delay around the closed loop formed by the transponders at the target station and the missile station. If the fixed delay introduced by the delay circuit 18 is known or can be ascertained at the ground station, by substracting this time from the period between output pulses from the receiver 22, the time delay due to propagation time between the target station and the missile station may be determined. Since the propagation time is directly proportional to the distance, the proportionality factor being the velocity of propagation or 186,000 miles per second, a direct measure of distance between the target station and the missile station can be ascertained at the ground station.

Distance indications are derived at the ground station by means of a computer 24 which drives a recorder 26. The computer 24 functions, in a manner hereinafter more fully described in connection with Figs. 2 and 3, to derive a signal which is indicative of the propagation time between the target station and the missile station, this signal being used to actuate the recorder 26. The recorder provides a continuous record of the distance between the target station and the missile station directly in units of length.

In order to calibrate the system so that the recorded information comes out in proper units of length, a calibrate circuit is provided at the ground station and at the target station. The calibrate circuit includes a transmitter 28 at the ground station which has an output carrier frequency of $f_2$, namely, 291 megacycles. The transmitter 28 is modulated by a 10 kc. oscillator 30. The transmitter 28 is keyed by a manually operated push button switch 32 which connects the transmitter 28 to a B+ supply 34.

When the push button switch 32 is closed to calibrate the system, a 10 kc. modulated pulse is transmitted to the target station where it is received by the receiver 16. A 10 kc. filter 36 on the output of the receiver 16 separates the calibrate pulse and applies it through an amplifier 38 to a relay 40. The relay 40 preferably includes a holding circuit, such as an R-C circuit, for maintaining the relay closed following a pulse for a period of the order of 20 seconds. The relay 40, when closed by the calibrate pulse at the ground station, gates on an oscillator 42 which is designed to oscillate at the difference frequency of the two carrier signals in the transponder loop, namely, 36 megacycles.

The oscillator 42 is coupled to antenna 46 through a mixer 44. The antenna is adapted to receive energy from the radiated signal of the transmitter 14. The carrier signal derived from the transmitter 14 is beat with the local oscillator signal from the oscillator 42 in a mixer 44 so as to re-radiate a signal at the frequency $f_2$ which is coupled to the receiver 16. Thus it will be seen that the effect of the oscillator 42 and mixer 44 is to provide a shunting link between the transmitter 14 and the receiver 16, forming a short regenerative loop which does not include the missile station or the propagation path between the target station and the missile station.

Assuming that the time delay of the missile station is substantially zero, as is generally the case, it will be seen that the target station will now oscillate at a regenerative frequency determined solely by the fixed time delay 18. The regenerative frequency, with the oscillator 42 gated on, corresponds to the frequency at zero range between the target station and the missile station.

The signal derived from the receiver 22 during the time the oscillator 42 is gated on is a pulse modulated signal in which the period between pulses is a measure of the fixed time delay of the target station, which is substantially the time delay of the delay circuit 18. A relay 48, which is closed by the closing of the push button 32, sets up a calibrating phase in the computer 24 whereby the computer 24 adjusts itself to produce a zero range indication on the recorder 26 during the calibrate phase of operation.

Referring to Figs. 2 and 3, the output from the receiver 22 is fed to a binary divider or counter circuit 50, which preferably is designed to provide a dividing ratio of 256 to 1. Thus the output from the last flip-flop in the binary divider 50 is a rectangular wave having a period of 256 times the period of the pulses received by the receiver 22 from the target station. The output wave form of the binary divider 50 is shown in Fig. 3a.

The output of the binary divider 50 is coupled to a differentiating and clipping circuit 52 which puts out pulses at intervals corresponding to one period of the output rectangular wave from the divider 50. The output pulses from the differentiating and clipping circuit 52 are shown in Fig. 3b. These pulses trigger a phantastron delay circuit 54 which produces a delayed output pulse a period of time later determined by an applied D.C. bias voltage derived from a potentiometer 56.

The output from the differentiating and clipping circuit 52 and the output from the phantastron delay circuit 54 are applied to a bistable multivibrator 58, the respective output pulses from the differentiating and clipping circuit 52 and the phantastron delay 54 being used to trigger the multivibrator 58 from one stable state to the other. Thus a rectangular pulse is derived from the multivibrator 58 which is initiated by a pulse from the differentiating and clipping circuit 52 and is terminated by the delayed pulse from the phantastron delay circuit 54. The wave form of the output from the multivibrator 58 is shown in Fig. 3c. It will be noted that since the delay of the phantastron is variable, the position of the trailing edge of the rectangular pulse is accordingly made variable. The time duration of the rectangular pulse from the multivibrator 58 may be less than half the period of the output from the divider 50, as shown by the solid line in Fig. 3c or it may be greater, as indicated by the dotted line in Fig. 3c.

The output signal from the binary divider 50 and the output signal from the multivibrator 58 are applied to a difference gate 60. The output of the difference gate goes positive when the potential level of the output from the binary divider 50 is positive with respect to the output level of the multivibrator 58, and goes negative when, vice versa, the output level of the multivibrator 58 is positive with respect to the level of the binary divider 50. Thus it will be seen that an output pulse is derived from the difference gate 60 which corresponds in duration to the difference in time between the trailing edges of the positive portion of the output signals derived from the binary divider 50 and the multivibrator 58. The polarity of these pulses from difference gate 60 is determined by the relative duration of the positive portion of the wave form of the divider 50 and the multivibrator 58. The output of the difference gate 60 is shown in Fig. 3d.

During the calibrate phase of operation, the relay 48 is energized in response to closing of the push button switch 32, the relay when energized coupling the output of the difference gate 60 to a servo control amplifier 62 which operates a servo motor 64 for controlling the potentiometer 56. Thus a closed loop servo control is provided by means of which the phantastron delay is adjusted to reduce the output of the difference gate 60 to zero, which occurs when the positive pulse derived from the multivibrator 58 is of exactly the same duration as the first half cycle of the output of the divider 50. By this means the duration of the positive pulse derived from the multivibrator 58 may be made exactly proportional to the fixed delay of the target station during the calibrate phase of operation.

Any subsequent drift in the fixed delay of the target station changes the period of the rectangular wave derived from the binary divider 50, causing the servo loop to readjust the delay of the phantastron 54 accordingly.

It will be seen that in normal operation, the period of the output of the binary divider 50 will be proportional to the total time delay in the closed loop involving the transponders at the target station and the missile station. As the distance between the target and missile increases, the period of the rectangular wave from the binary divider 50 increases accordingly. As a result a pulse is derived from the difference gate 60 which is proportional to the difference in delay time at zero range, as set by the phantastron delay 54 and the delay at the instantaneous range between the target and missile.

This difference pulse, as shown in Fig. 3d, is used to gate on a clock pulse generator 66. The generator 66 has a pulse repetition frequency of 390 kilocycles, which means that the period between pulses corresponds to a range of 10 feet. The output of the clock pulse generator is shown in Fig. 3e.

Clock pulses are fed to a decimal divider 68 by which each of ten output lines are successively energized by successive pulses from the pulse generator 66. The tenth pulse, in energizing the tenth output line from the decimal divider 68, triggers a decimal divider 70. The divider 70 in turn has ten output lines which are successively energized by every tenth clock pulse from the generator 66. The tenth output line from the decimal divider 70 is in turn coupled to the input of a third decimal divider 72, which has ten output lines which are successively energized by every one hundredth pulse from the clock pulse generator 66. The respective output lines from the decimal dividers 68, 70 and 72 are coupled by coincidence gates, indicated generally at 74, 76 and 78, to respective styluses of a continuous strip recorder, indicated generally at 26.

The recorder 26 includes thirty styluses which are respectively driven by the thirty output lines from the decimal dividers 68, 70 and 72. The recorder 26 preferably is of the type using thermally-sensitive paper by means of which an electrical impulse to a particular stylus produces a corresponding dot on the paper. Thus, for example, if the clock pulse generator generates twenty-five pulses during the time the generator is gated on by the output of the difference gate 60, at the end of those twenty-five pulses the number 5 output line from the divider 68 and the number 2 output line from the divider 70 and the zero output line from the divider 72 are energized. The coincidence gates 74, 76 and 78 are normally closed but are triggered on by the output from the differentiating and clipping circuit 52 through a pulse shaper 80, whereby the respective styluses in the recorder 26 are momentarily energized to provide a permanent record on the continuous recording strip. It will be apparent that the pattern on the strip can readily be interpreted in terms of distance by multiplying the indicated decimal number, which in the terms of the example would be 025, by ten to derive the range in feet. A new reading is taken every 256 cycles at the regenerative frequency in the ringing circuit.

From the above description it will be seen that an improved miss-distance indicator (M.D.I.) is provided which can be readily monitored at a ground station and automatically recalibrated regardless of drifts or other changes in parameters at the remote target or missile stations. The system has the advantage that it is self-telemetering, i.e. it does not require separate apparatus at the target station for translating the measurement information and re-transmitting it to a ground station. Furthermore the information monitored by the ground station is directly presentable in terms of range and requires no plotting or special computation to convert the information to range.

While the invention has been particularly described as a system for continuously indicating the range between two stations both of which are moving with respect to each other and with respect to a ground station, the invention is not necessarily limited to such a system. For example, the missile station in an alternative arrangement might be made a fixed ground station. An equivalent of the target station and the ground station combined may be provided on a navigating aircraft. Thus the system could be used as distance measuring equipment (D.M.E.) for deriving range information on a navigating aircraft or the like.

I claim:

1. Apparatus for measuring the distance between first and second stations, wherein said stations have a pair of radio transmission channels therebetween interconnected at the two stations to form a closed loop transmission path with means for circulating a modulated pulse around said loop, the period of the pulse in travelling around the loop including the propagation time delay between the stations and a fixed time delay in at least one of the stations, said apparatus including a separate distance indicating station remote from said first and second stations having a receiver tuned to the carrier frequency of one of said channels, means for generating a pulse having a duration equal to the time interval established by a fixed number of demodulated pulses from the receiver, means for generating a pulse having an adjustable duration, means for indicating the difference in duration of the respective pulses, means at said one of said stations having the fixed time delay for selectively intercoupling the two transmission channels whereby the closed loop delay may be selectively reduced to the amount of the fixed delay, means for periodically transmitting a calibrate signal to the remote station for periodically activating said intercoupling means, and servo means at the distance indicating station responsive to said difference indicating means to adjust said means for generating a pulse of adjustable duration to reduce said difference to zero, the servo means including means activated simultaneously with the transmission of the calibrate signal for activating the servo means, whereby the servo means adjusts the difference between the respective pulses to zero when the intercoupling at said one station is activated.

2. Apparatus for measuring the distance between first and second remote stations, wherein said stations have a pair of radio transmission channels therebetween interconnected at the two stations to form a closed loop transmission path with means for circulating a modulated pulse around said loop, the period of the pulse in travelling around the loop including the propagation time delay between the stations and a fixed delay in at least one of the stations, said apparatus including a separate distance indicating station having a receiver tuned to the carrier frequency of one of said channels, means for indicating the time intervals between a fixed number of demodulated pulses, means at said one of said stations having the fixed delay for selectively intercoupling the two transmission channels whereby the closed loop delay is reduced to the amount of the fixed delay, means for periodically transmitting a calibrate signal to the remote station for periodically activating said intercoupling means, and calibrating means for adjusting said indicating means to a value determined by the time interval between said fixed number of demodulated pulses, said calibrating means being activated by said calibrate pulse.

3. Apparatus for measuring the distance between first and second remote stations, wherein said stations have a pair of radio transmission channels therebetween interconnected at the two stations to form a closed loop transmission path with means for circulating a modulated pulse around said loop, the period of the pulse in travelling around the loop including the propagation time delay between the stations and a significant fixed time delay in at least one of the stations, said apparatus including a remote distance indicating station having a receiver tuned to the carrier frequency of one of said channels, means responsive to the receiver output for generating a pulse having a duration equal to the time interval between a fixed number of transmission periods of the pulses around the closed loop, means for generating a pulse having an adjustable duration time, means for indicating the difference in duration of the respective pulses, means at said one of said stations having the fixed delay for selectively intercoupling the two transmission channels whereby the closed loop delay may be periodically reduced to the amount of the fixed delay, means for periodically activating said intercoupling means, and servo means responsive to said difference indicating means for adjusting said means for generating a pulse of adjustable duration to reduce said difference to zero, the servo means including means for activating the servo means at the same time as the interconnecting means is activated, whereby the servo means adjusts the time difference between duration of the respective pulses to zero when the intercoupling at said one station is activated.

4. Apparatus for measuring the distance between first and second remote stations, wherein said stations have a pair of radio transmission channels therebetween interconnected at the two stations to form a closed loop transmission path with means for circulating a modulated pulse around said loop, the period of the pulse in travelling around the loop including the propagation time delay between the stations and a significant fixed delay in at least one of the stations, said apparatus including a remote distance indicating station having a receiver tuned to the carrier frequency of one of said channels, means at said one of said stations having the fixed delay for selectively intercoupling the two transmission channels whereby the closed loop delay may be periodically reduced to the amount of the fixed delay, means for periodically activating said intercoupling means, means responsive to the period between pulses occurring at a given point in the loop for generating a first signal indicative of said period, means responsive to the shortened period between pulses occurring at a given point in the loop when it is shunted by said intercoupling means for generating a second signal indicative of said shortened period, said second signal being indicative of the fixed time delay of the system, and means responsive to said first and second signals for indicating the difference therebetween.

5. A distance measuring system comprising first and second stations each including transmitting and receiving means, the respective transmitters having different carrier frequencies, means for coupling the output of the receiver to the input of the transmitter at the first station including a detector and amplifier, means for coupling the output of the receiver to the input of the transmitter at the second station including a detector, a fixed delay circuit, and an amplifier, whereby a closed loop capable of sustaining oscillations is provided, means for calibrating the system including an oscillator at the second station having a frequency equal to the difference frequency between the carrier of the two transmitters, a mixer coupled to the oscillator, means for coupling the mixer to the output of the transmitter and to the input of the receiver in the second station, means for periodically gating on the oscillator, whereby the output of the transmitter is effectively directly coupled to the receiver periodically to shunt out the portion of the oscillating closed loop including the first station and the propagation paths between the first and second stations, the remaining portion of the closed loop oscillating at a frequency corresponding to a zero range between the first and second stations, and means for indicating the time difference between the period of a predetermined number of cycles of the regenerative loop with the oscillator gated off and with the oscillator gated on.

6. A distance measuring system comprising first and second stations each including transmitting and receiving means, the respective transmitters having different carrier frequencies, means for coupling the output of the receiver to the input of the transmitter at the first station including a detector and amplifier, means for coupling the output of the receiver to the input of the transmitter at the second station including a detector, a fixed delay circuit, and an amplifier, whereby a closed loop capable of sustaining oscillations is provided, means for calibrating the system including frequency converter means for intercoupling the output of the transmitter directly to the input of the receiver in the second station, means for periodically gating on said intercoupling means, whereby the output of the transmitter is effectively directly coupled to the receiver periodically to shunt out the portion of the oscillating closed loop including the first station and the propagation paths between the first and second stations to cause the remaining portion of the closed loop to oscillate at a frequency corresponding to a zero range between the first and second stations, and means for indicating the time difference between the period of a predetermined number of cycles of the regenerative loop with the oscillator gated off and with the oscillator gated on.

7. Apparatus comprising a regenerative circuit including first and second transponders coupled to form a closed loop transmission path, one of the transponders having a fixed time delay, and means for superimposing a modulation pulse in said closed loop transmission path, whereby the modulation pulse is caused to recirculate around said closed loop, the pulse period being determined by the propagation time between the transponders and the fixed delay time of each one of the transponders, means responsive to successive pulses appearing at a fixed position in the closed loop transmission path for producing a first signal indicative of the period between successive pulses, means for directly coupling the output to the input of said one of the transponders having a fixed delay, whereby a closed loop transmission path is formed in which the delay time around the loop is equal to the fixed delay of said transponder, means responsive to successive pulses at a fixed position in the shortened closed loop transmission path for producing a second signal indicative of the period between successive pulses in the shortened loop, and distance indicating means responsive to the difference between the first and second signals for producing a distance indication proportional to said difference.

8. Apparatus as defined in claim 7 wherein said distance indicating means includes means for generating pulses, means for gating on said generating means for an interval proportional to said difference between the first and second signals, and means for indicating the number of pulses generated by said pulse generating means during said interval.

References Cited in the file of this patent

UNITED STATES PATENTS 2,509,331     Brannen  ---------------- May 30, 1950

FOREIGN PATENTS 288,233     Great Britain ------------ Sept. 6, 1928